United States Patent [19]
Mehta

[11] Patent Number: 5,627,527
[45] Date of Patent: *May 6, 1997

[54] THERMOSTATICALLY CONTROLLED REMOTE CONTROL FOR A CEILING FAN AND LIGHT

[75] Inventor: Vinay Mehta, Germantown, Tenn.

[73] Assignee: Hunter Fan Company, Memphis, Tenn.

[*] Notice: The term of this patent shall not extend beyond the expiration date of Pat. No. 5,529,229.

[21] Appl. No.: 570,490

[22] Filed: Dec. 11, 1995

Related U.S. Application Data

[63] Continuation of Ser. No. 143,192, Oct. 29, 1993, Pat. No. 5,528,229.

[51] Int. Cl.⁶ .................................................. G05R 19/02
[52] U.S. Cl. ................. 340/825.06; 340/825.22
[58] Field of Search ............ 340/825.06, 825.22; 364/143, 144

[56] References Cited

U.S. PATENT DOCUMENTS

| | | |
|---|---|---|
| 3,065,397 | 11/1962 | Crawford . |
| 3,526,839 | 9/1970 | Schmoock et al. . |
| 3,534,335 | 10/1970 | Hogan et al. . |
| 3,801,888 | 4/1974 | Faulkner . |
| 4,189,094 | 2/1980 | Robinson . |
| 4,274,145 | 6/1981 | Hendricks et al. . |
| 4,315,413 | 2/1982 | Baker . |
| 4,316,256 | 2/1982 | Hendricks et al. . |
| 4,325,081 | 4/1982 | Abe et al. ............... 364/144 X |
| 4,426,615 | 1/1984 | Hannas . |
| 4,473,183 | 9/1984 | Kensinger et al. . |
| 4,538,973 | 9/1985 | Angott et al. . |
| 4,549,601 | 10/1985 | Wellman et al. . |
| 4,570,216 | 2/1986 | Chan ........................ 364/143 |
| 4,621,992 | 11/1986 | Angott . |
| 4,630,670 | 12/1986 | Wellman et al. . |
| 4,642,441 | 2/1987 | Kenyon . |
| 4,719,446 | 1/1988 | Hart . |
| 4,734,628 | 3/1988 | Bench et al. . |
| 4,818,920 | 4/1989 | Jacob . |
| 4,851,708 | 7/1989 | Palmer . |
| 4,890,666 | 1/1990 | Clark . |
| 4,902,906 | 2/1990 | Murphy . |
| 4,942,921 | 7/1990 | Haessig et al. . |
| 4,947,302 | 8/1990 | Callahan . |
| 4,947,654 | 8/1990 | Sink et al. . |
| 4,978,896 | 12/1990 | Shah . |
| 5,005,636 | 4/1991 | Haessig . |
| 5,041,825 | 8/1991 | Hart et al. . |
| 5,049,801 | 9/1991 | Potter . |
| 5,088,645 | 2/1992 | Bell . |
| 5,126,642 | 6/1992 | Shahrodi . |
| 5,187,472 | 2/1993 | Hart et al. . |
| 5,189,412 | 2/1993 | Mehta et al. . |
| 5,191,265 | 3/1993 | D'Aleo et al. . |
| 5,198,809 | 3/1993 | Day . |
| 5,237,207 | 8/1993 | Kwiatkowski et al. . |

(List continued on next page.)

OTHER PUBLICATIONS

Lutron Residental Systems Div., "Homeworks Integrated Lighting Control System," Feb. 1994, pp. 4–5.

*Primary Examiner*—Edwan C. Holloway, III
*Attorney, Agent, or Firm*—Baker & Botts, L.L.P.

[57] ABSTRACT

An apparatus and method for thermostatically controlling the operation of a multiple speed fan and light assembly by inputting a desired temperature range and airflow direction for each fan speed and by inputting a single number for controlling the on time and duration of the light assembly. A temperature sensor determines an initial room temperature, an input device enters a temperature set-point corresponding to each of the fan speeds, a processor stores the temperature set-points corresponding to each of the fan speeds from the input device, receives the temperature signal and uses the temperature signal and the temperature set-points to determine a desired fan speed, and a fan driving device changes the initial rotation speed to the desired fan speed in response to the processor and thereby automatically controls the fan speed.

3 Claims, 13 Drawing Sheets

U.S. PATENT DOCUMENTS

| | | |
|---|---|---|
| 5,291,190 | 3/1994 | Scarola et al. . |
| 5,300,864 | 4/1994 | Allen, Jr. . |
| 5,341,649 | 8/1994 | Nevitt et al. . |
| 5,364,026 | 11/1994 | Kundert . |
| 5,369,584 | 11/1994 | Kajiwara . |
| 5,385,297 | 1/1995 | Rein et al. . |

THERMOSTATICALLY CONTROLLED REMOTE CONTROL FOR A CEILING FAN AND LIGHT

This application is a continuation of application Ser. No. 08/143,192, filed Oct. 29, 1993, now U.S. Pat. No. 5,528,229, entitled "THERMOSTATICALLY CONTROLLED REMOTE CONTROL FOR A CEILING FAN AND LIGHT".

BACKGROUND OF THE INVENTION

1. Field Of The Invention

The invention relates to the field of remote controlled ceiling fans and light assemblies and particularly, to the field of thermostatically controlled remote control ceiling fans and light assemblies.

2. Description Of The Related Art

Modern ceiling fans may be controlled to operate at a plurality of different speeds from a relatively low speed to a high maximum speed. Low speeds may be desirable to provide for general air circulation and to eliminate "hot" or "cold" spots within a room. Higher speeds may be desirable for cooling effect (in summer) or to eliminate temperature gradients (in winter). In addition, the direction of fan blade rotation may be reversed. In winter, it is generally desirable to have the fan blade rotate such that the pitch of the blades creates an upward airflow to circulate hot air away from the ceiling. In the summer, it may be desirable to reverse the direction of rotation to create a downward airflow and, thereby, to provide a cooling effect on the occupants in the room. A ceiling fan is often combined with a light fixture or fixtures, the light intensity level of which may be varied from low to high levels. Most ceiling fans are designed so that they may be installed in existing ceiling junction boxes to replace existing light fixtures.

Automatic control of fans based upon temperature in the room containing the fan is generally known. For example, U.S. Pat. No. 5,049,801 to Potter discloses an attic ventilator fan which is operated at two speeds. The fan is operated at a low speed when the temperature in the attic exceeds a first temperature value and is switched to a high speed when the temperature in the attic exceeds a second higher temperature value. If, subsequently, the temperature falls below the first temperature, the fan is shut off. Similarly, if the temperature falls below the second higher temperature, the fan is switched from the high speed to the low speed.

Remote control ceiling fans are also generally known. For example, U.S. Pat. No. 5,041,825 to Hart et al. discloses a remote control device for a combined ceiling fan and light fixture. In this design, a sensor monitors the temperature in the room containing the combined ceiling fan and light fixture. A keyboard is provided for turning the fan and light on and off; controlling fan speed, direction and light intensity; and selecting a mode of operation. The fan control measures the room temperature every two minutes. The room temperature is compared to a base temperature which is set by the user, and a target fan speed is calculated based upon the temperature differential between room temperature and base temperature. Target speed is calculated as even increment differences from the base temperature. For example, if the equal increment is set at 1.5° F. and if a base temperature of 80° F. and a base speed of 3 for a six speed fan is selected, the auto-speed mode would operate according to the following schedule:

TABLE 1

| Operation Schedule Of Hart et al. | |
| --- | --- |
| TEMP | SPEED |
| 84.5 | High |
| 83 | 5 |
| 81.5 | 4 |
| 80 | 3 |
| 78.5 | 2 |
| 77 | 1 |
|  | Off |

Current fan controllers do not allow selecting fan speed to operate according to a predetermined temperature range. Rather, they limit the user to selecting one base temperature and one base speed equal to current room temperature and current fan speed if the fan is on when automatic mode is activated. Alternatively, the base temperature and speed may be equal to current room temperature and the middle speed, for example speed 3, if the fan is off when automatic mode is activated. Current fan controllers also fail to disclose a selective programming of the light to turn on at a certain time and turn off after a set duration.

SUMMARY OF THE PRESENT INVENTION

It is an object of the present invention to provide a combined ceiling fan and light assembly, such that a user may select fan speed for each of a plurality of temperature ranges. It is an advantage of the present invention that the operator may choose the temperatures above which each speed of the fan is to be operated.

It is another object of the present invention to provide a remote controlled ceiling fan and light assembly which allows for the direction of airflow created by the fan to be selected by an operator to reverse over several temperature ranges. It is an advantage of the present invention that the operator may choose the direction of flow of the fan at each temperature and thereby program the operation of the fan for every season of the year.

It is yet another object of the present invention to provide a remote controlled ceiling fan and light assembly in which upon entry of a single value, the light will turn on and off according to a predetermined schedule. Further, an on time and duration of operation of the light assembly may be selected by an operator.

It is another object of the present invention that a ceiling fan and light assembly may provide for manual override of the automatic control of the fan and the automatic control of the light. It is an advantage of the present invention that a user may manually determine the operation of the fan or light assembly, while automatic operation of the other elements of the assembly continues.

The apparatus of the present invention is adapted for controlling the operation of a multiple speed fan operating at an initial rotation speed selected from multiple speeds, including a zero speed or off. The apparatus comprises a temperature sensor for determining room temperature and providing a signal indicative thereof, an input device for entering a temperature set-point corresponding to each of the fan speeds, a first processor for storing the temperature set-points corresponding to each of the fan speeds from the input device, for receiving the temperature signal, and for comparing the room temperature and the temperature set-points to determine a desired fan speed, and a fan driving device for changing the initial rotation speed to the desired fan speed in response to the first processor and thereby automatically controlling the fan speed.

Another embodiment according to the present invention comprises an input device for receiving a program number and a memory for storing a look-up table corresponding a plurality of program numbers to a plurality of on-time values and duration values. Each program number thereby serves as an index into the look-up table for determining an on-time value and a duration value. A time input means provides a current time signal. A processor uses the program number to index the look-up table to determine a current on-time value and a current duration value, computes an off-time value as the sum of the current on-time value and the current duration value, and uses the current on-time value, the current duration value, and the current time signal to determine whether to turn the light on or off. A light driving circuit is connected to the light for turning the light on or off in response to the processor determination.

In addition, the preferred embodiments include a method of operating a multiple speed ceiling fan. According to one preferred method of operation, a temperature set-point corresponding to each of the ceiling fan speeds is input to a processor. Those temperature set-points are then stored in a memory. A room temperature value is measured. Then, using the temperature value and the set-point temperature corresponding to each of the ceiling fan speeds, a desired fan speed is determined. The current fan speed is then switched to the desired fan speed.

Another method of operation comprises inputting to a processor a program number and a look-up table corresponding a plurality of program numbers to a plurality of on-time values and duration values. Each program number serves as an index into the look-up table for determining an on-time value and a duration value. A time is then measured. The program number is then used as an index into the look-up table to determine a current on-time value and a current duration value. An off-time value is computed as the sum of the current on-time value and the current duration value. Using the current on-time value, the current duration value, and the current time signal, the processor determines whether to turn the light on or off. Finally, the light is turned on or off in response to the determination.

Other objects, advantages and features of the present invention will be understood from the detailed description of the preferred embodiments and the drawings.

DETAILED DESCRIPTION OF THE PREFERRED EMBODIMENTS

Figure 1:
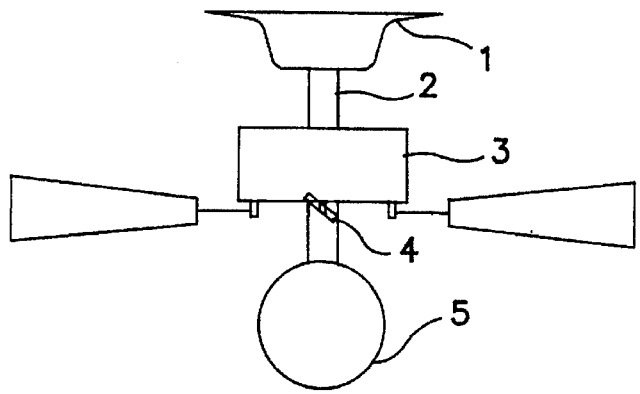
FIG. 1 depicts a frontal view of a typical ceiling fan according to the prior art.

As shown in FIG. 1, a conventional ceiling fan has a canopy 1, stem 2, motor housing 3, and switch housing 4. Additionally, such a fan may have a light 5 connected to switch housing 4. Also, a plurality of fan blades, usually four or five, are driven by a fan motor disposed in motor housing 3.

Figure 2:
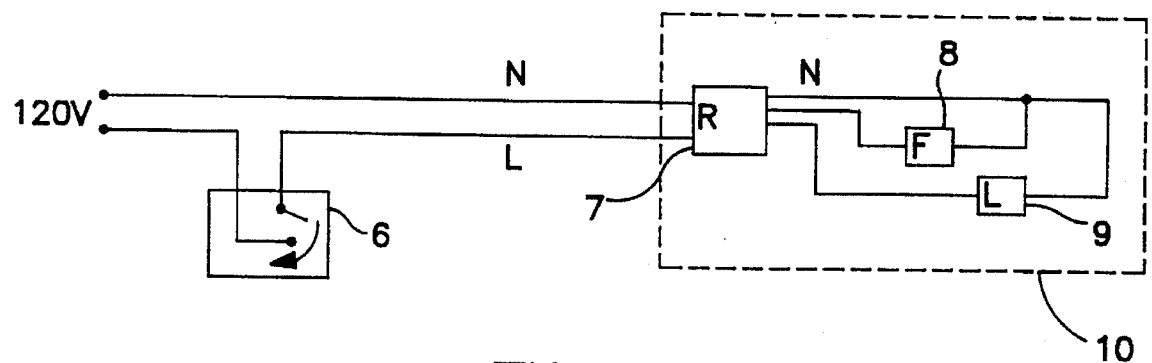
FIG. 2 depicts a schematic representation of the wiring connection of a receiver according to one preferred embodiment of the present invention.

According to one preferred embodiment of the present invention, a remote control system is used for automatically controlling the operation of the fan and light. With reference to FIGS. 2–13, one of the preferred embodiments of the present invention will be described. Referring to FIG. 2, an electrical connection for a remote control receiver unit 7 is depicted. Remote control receiver unit 7 may be provided for controlling fan unit 8 and light unit 9 and, therefore, is connected to each of these devices. Remote control receiver unit 7 may be designed to operate on 120 V AC power supplied from a typical electrical line in a residential or commercial building. Switch unit 6 may be engaged to continually provide AC power to remote control receiver unit 7 to enable the unit to control operation of the fan and light. Fan/light receiver assembly 10 may be located within canopy 1, fan motor housing 3, or switch housing 4, or even in a separate assembly attached near the fan on the ceiling. In the case of a separate assembly, wiring from the separate assembly may be connected to the fan motor and light through the stem 2.

Figure 3A:
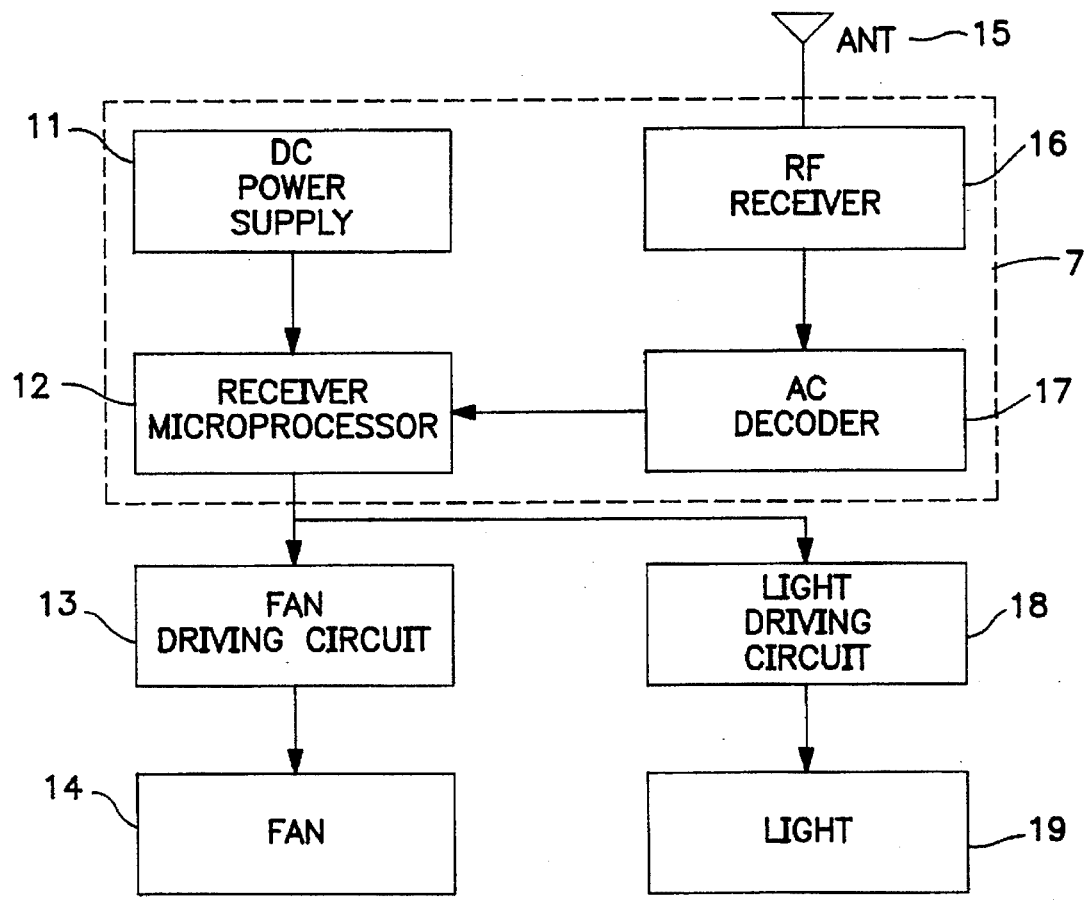
FIGS. 3(a) and 3(b) depict schematic representations of a receiver and transmitter according to one preferred embodiment of the present invention.
Figure 3B:
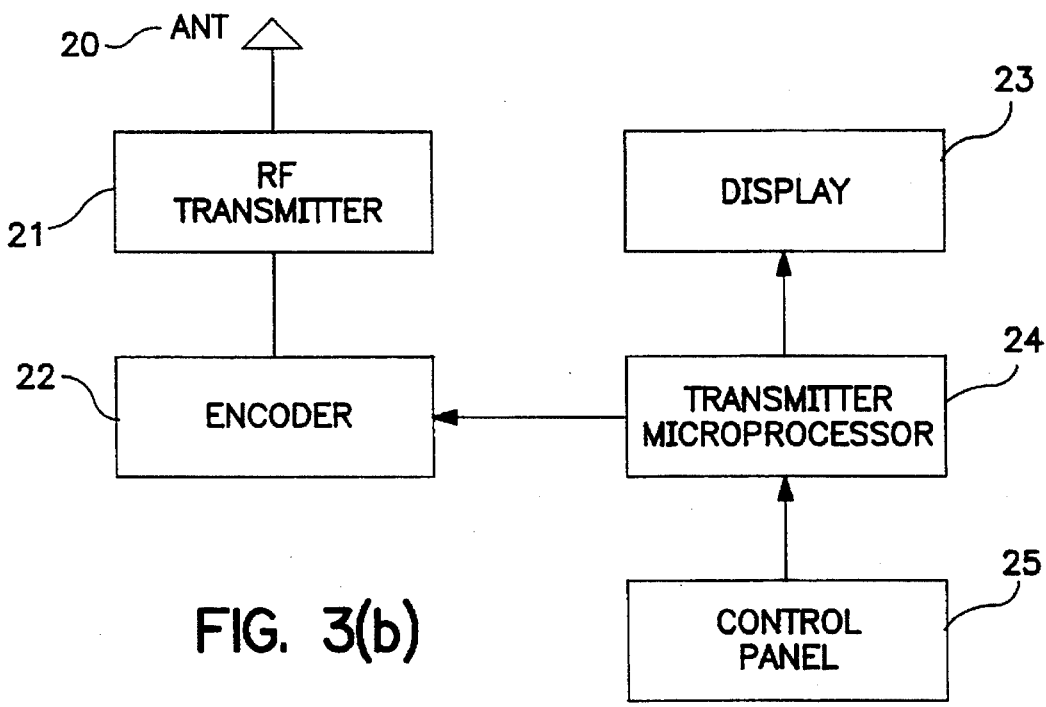
Figure 4:
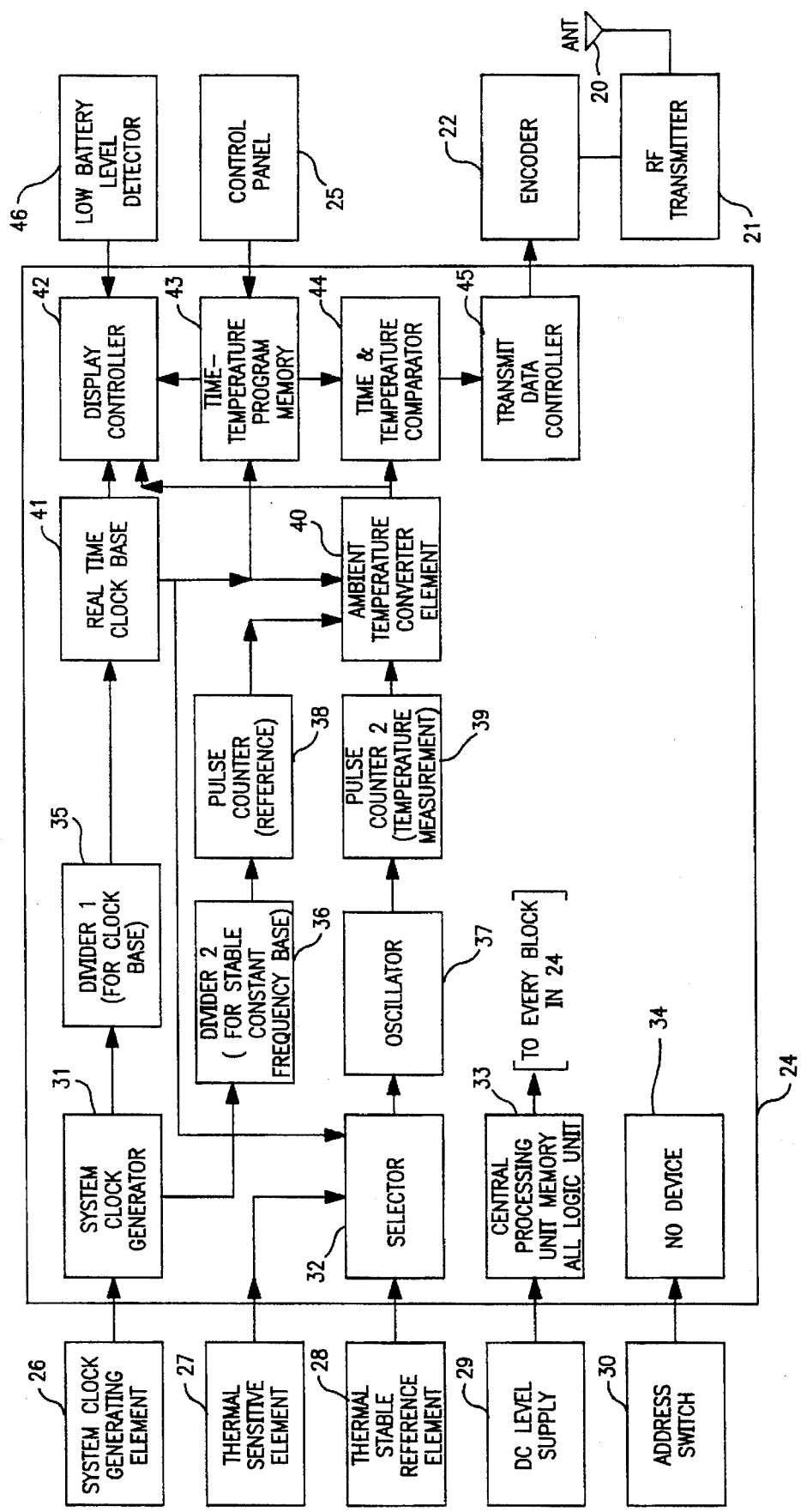
FIG. 4 depicts a detailed schematic representation of a transmitter unit according to one preferred embodiment of the present invention.

FIGS. 3(b) and 4 depict detailed schematic representations of a transmitter system according to one of the preferred embodiments of the present invention. The transmitter system, as shown in FIG. 3(b), comprises a display 23, transmitter microprocessor 24, control panel 25, encoder 22, RF transmitter 21 and antenna 20. Transmitter microprocessor 24 receives information supplied by control panel 25, which is described in more detail below, and controls the operation of display 23 and RF transmitter 21 via encoder 22. RF transmitter 21 sends coded digital RF signals on a high frequency carrier. RF transmitter 21 may be a conventional RF transmitter design having an oscillator for generating high frequency carrier waves. These carrier waves are preferably in the range of about 300 MHz to about 310 MHz. Information to be transmitted from transmitter microprocessor 24 is supplied to encoder 22. The signal generated from encoder 22 is superimposed over the carrier wave and transmitted via antenna 20.

Display 23 may employ any of numerous display technologies, such as LED, LCD, CRT, or the like. One preferred embodiment of display 23 is described below with reference to FIG. 7. Control panel 25 may include any of numerous devices for inputting information, such as buttons, a keyboard, a knob, or the like. Referring particularly to FIG.

4, there is shown a detailed schematic of transmitter microprocessor 24. Preferably, transmitter microprocessor 24 is a single chip microcomputer. For example, an OKI MSM64164 may be used. The OKI MSM64164 has 4096 bytes of read-only memory (ROM) for storing software and 256×4 bits of random-access memory (RAM). Transmitter microprocessor 24 stores default programs in either RAM or ROM which become active when the chip is supplied with power for the first time or if transmitter microprocessor 24 is reset by a reset button (not shown). The default programs or a user selected program may be entered via control panel 25 as described below with respect to FIG. 6.

Transmitter microprocessor 24 comprises a system clock generating element 26, such as a crystal. System clock generator 31 generates an essential timing signal based on system clock generating element 26. Divider 35 divides the timing signal from system clock generator 31 to generate a one pulse per second (1 Hz) timing signal. Divider 35 transmits the 1 Hz signal to real clock base 41 which provides the 1 Hz signal to time-temperature program memory 43. Thermal sensitive element 27 and thermal stable reference element 28 preferably comprise thermistors. Real time clock base 41 provides the 1 Hz signal to selector 32 as well. Using the 1 Hz signal as a trigger, selector 32 delivers a temperature varying signal to oscillator 37 every second. Oscillator 37 receives the temperature varying selector signal and delivers digital pulses proportional to the frequency of the signal delivered to the oscillator. The digital pulses from oscillator 37 are then fed to pulse counter 39. Pulse counter 39 counts the number of digital pulses delivered. Ambient temperature conversion element 40 receives the count determined by pulse counter 39 every second and compares this number with the stable pulse counter 38 output. Using pulse counter 39 and pulse counter 38 as input, ambient temperature conversion element 40 indexes a look-up table stored in memory to determine the ambient temperature.

Every second on the 1 Hz pulse from real clock base 41, time-temperature program memory 43 supplies time and temperature comparator 44 with various time-temperature values to compare with the measured time and temperature values. Time and temperature comparator 44 operates under control of CPU 33, as described below with respect to FIGS. 12(a)-12(d). If time and temperature comparator 44 indicates that an action is required, such as the light needs to be turned on, dimmed, or turned off or the fan rotation speed needs to be increased or decreased, transmit data controller 45 is activated. Based upon time and temperature comparator 44, control transmit data controller 45 transmits a signal indicative of the request to encoder 22. Encoder 22 encodes the signal, preferably, in digital format. RF transmitter 21 then may transmit the encoded digital signal on a high frequency carrier via antenna 20.

Still referring to FIG. 4, DC power supply 29 supplies all of the power for the transmitter microprocessor 24 via central processing unit (CPU) 33. CPU 33 controls the operation of the input and output of information via control panel 25. CPU 33 also provides an address for transmission by transmit data controller 45. The address is supplied by address switch 30. Address switch 30 may comprise a set of dip switches which allow a user to select a combination of switches to generate different combinations of encoded signals. Each combination of switches provides a different address to prevent interference from similar units in the vicinity. I/O device 34 provides an encoded digital signal to CPU 33 corresponding to the switches at address switch 30. CPU 33 connects to each block within transmitter microprocessor 24 to provide power, control and data. FIG. 4 also depicts a low battery level detector 46 which supplies a signal when the voltage level of the battery providing DC level supply 29 drops below a certain value. Low battery level detector 46 provides the signal to display controller 42 for display on display 23 which is described below with respect to FIG. 7.

Figure 5:
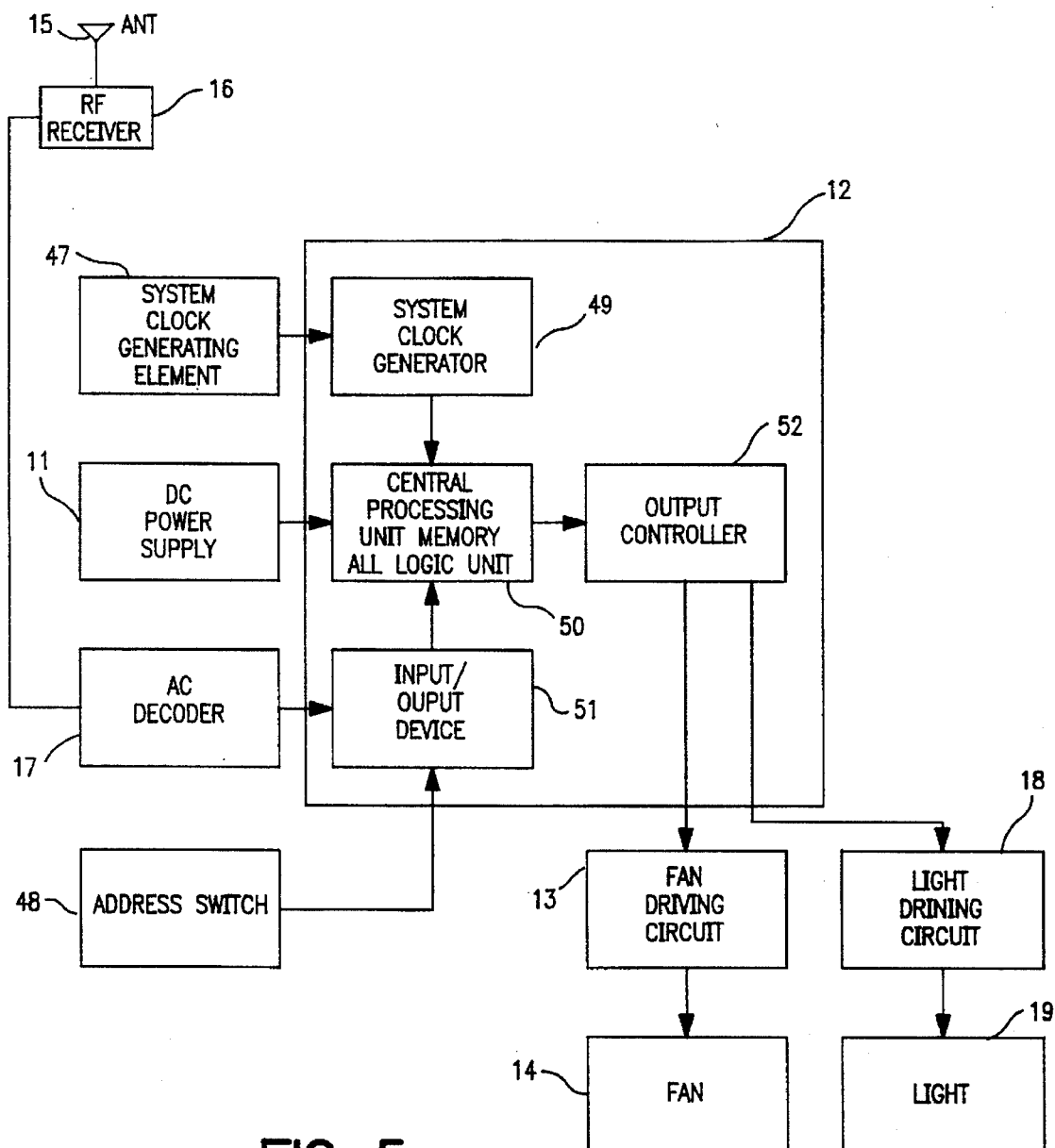
FIG. 5 depicts a detailed schematic representation of a receiver unit according to one preferred embodiment of the present invention.

FIGS. 3(a) and 5 depict schematic representations of a receiver system according to one preferred embodiment of the present invention. Remote control receiver unit 7 comprises a DC power supply unit 11, receiver microprocessor 12, RF receiver 16, and AC decoder 17. Remote control receiver unit 7 connects to an antenna 15, fan driving circuit 13 and light driving circuit 18. Fan driving circuit 13 controls fan 14 and light driving circuit 18 controls light 19.

DC power supply unit 11 converts AC 120 V power supplied from the electrical wiring in the residential or commercial building via switch 6 of FIG. 2 to a regulated DC power supply for receiver microprocessor 12. RF receiver 16 is a typical RF regenerative type receiver. RF receiver 16 receives a RF signal via antenna 15 and passes the received RF signal in the form of an AC signal to AC decoder 17. AC decoder 17 decodes the AC signal into digital information for transmission to receiver microprocessor 12. Receiver microprocessor 12 controls the operation of fan driving circuit 13 and light driving circuit 18.

As shown in FIG. 5, receiver microprocessor 12 comprises a system clock generator 49, CPU 50, input/output (I/O) device 51 and output controller 52. Receiver microprocessor 12 may be a single chip microcomputer, such as a Hitachi HD404201. The Hitachi HD404201 has 1024 bytes of ROM and 64×4 bits of RAM for data storage. CPU 50 receives power from DC power supply 11. System clock generator 49 provides the clock rate for the entire receiver microprocessor 12 based upon a system clock generating element 47, such as a crystal. System clock generator 49 provides a periodic signal for clocking in data from the I/O device 51. I/O device 51 receives data from AC decoder 17. Further, address switch 48 sets an address for receiving transmission from RF transmitter 21. Address switch 48 may compare, for example, a plurality of dip switches which may be selected in different combinations to generate different encoded addresses. The address switch 48 should be set to the same encoded value as is set in address switch 30 of transmitter microprocessor 24. By having a unique address for each receiver 7, multiple receivers 7 may be controlled by a single transmitter 21, or multiple transmitters 21 may control a single receiver 7. Alternatively, if desired, only one fan receiver 7 will be controlled by one transmitter 21, even if multiple fans are located within a single space. By setting the address switch 48 of a receiver 7 to correspond to address switch 30 of a transmitter, the user may control fan 14 and light 19 which are connected to receiver 7. Multiple fan and light assemblies may be controlled by setting each of the address switches 48 of the receivers 7 controlling those fan/light assemblies to correspond to the address switch 30 of a single transmitter 21.

Figure 6:
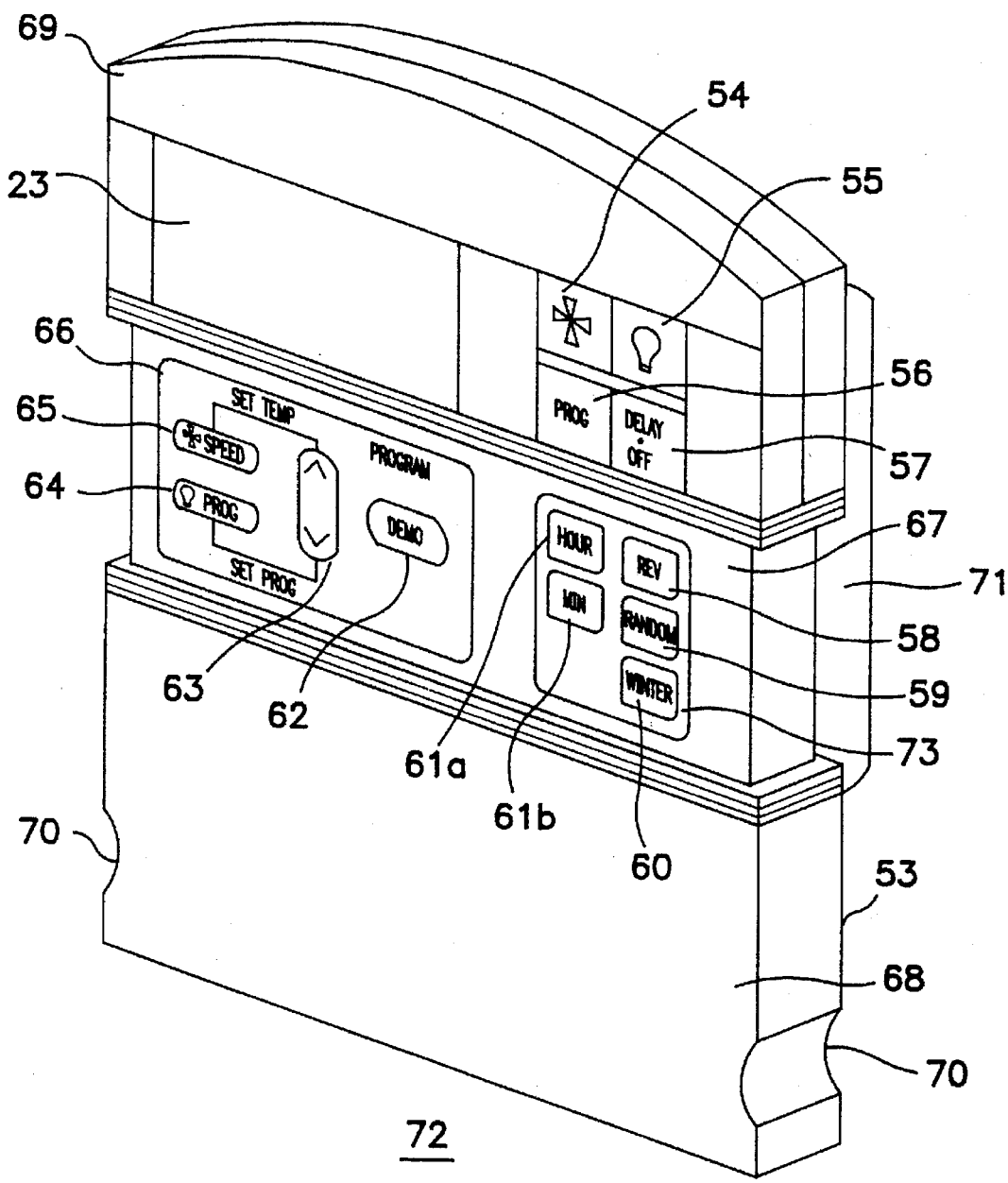
FIG. 6 depicts a perspective view of a remote control unit according to one preferred embodiment of the present invention.

FIG. 6 depicts one preferred embodiment of a remote control unit 72. Remote control unit 72 preferably has a top portion 69, middle portion 67, bottom portion 68 and mounting base 71. Remote control unit 72 may be mounted on a wall or the user can place remote control unit 72 in any appropriate place for monitoring the temperature within the room containing the fan. Top portion 69 of remote control unit 72 may comprise a display 23, fan override button 54, light override button 55, program button 56 and delay-off button 57. Middle portion 67 may comprise a programming keyboard 66 and panel 73. Programming keyboard 66 comprises a fan speed select button 65, light program select button 64, up-down button 63 and demonstration button 62. Panel 73 comprises an hour button 61a, minute button 61b, reverse fan direction button 58, random mode select button 59 and winter mode select button 60. Bottom portion 68 comprises two ridged semicircular cutouts 70. Ridged semicircular cutouts 70 enable bottom portion 68 to be slidably removed in a downward direction relative to top portion 69. Bottom portion 68 may contain, for example, a battery container for use by DC level supply 29 (FIG. 4). Mounting base 71 provides a bracket for mounting remote control unit 72 onto a wall, or for resting remote control unit 72 on a table.

Toggle switches, thermal-sensitive buttons or knobs may be employed for the buttons on panel 73, keyboard 66 or buttons 54-57. Keyboard 66 may also include a number pad, wherein certain number combinations represent fanspeed select and light program number.

Figure 7:
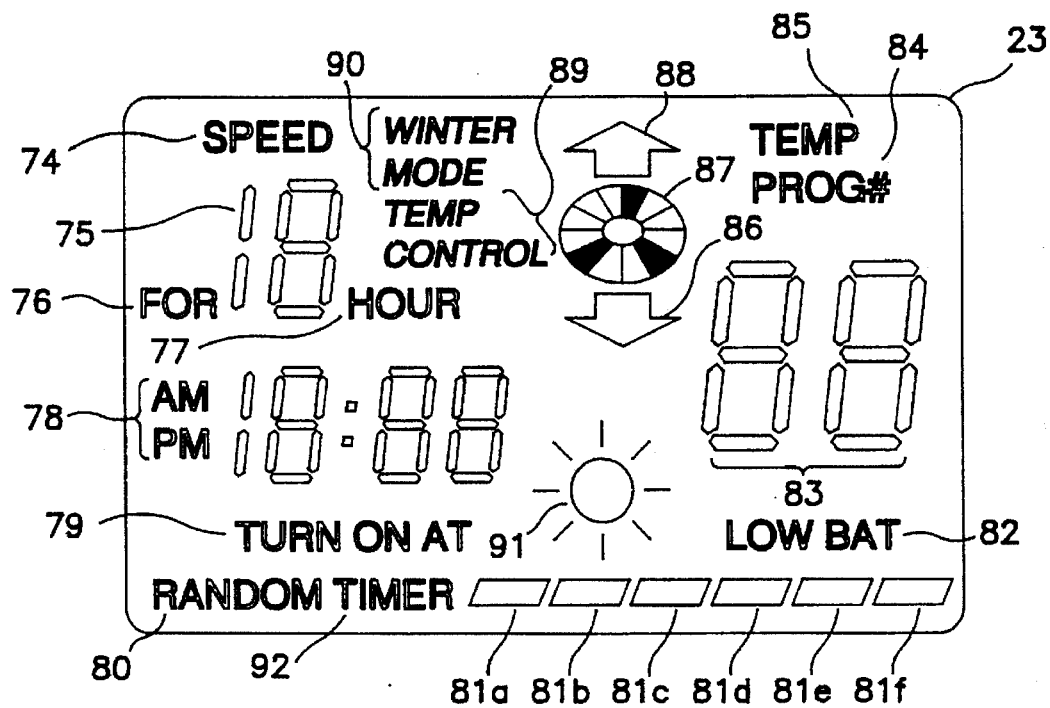
FIG. 7 depicts a display screen according to one preferred embodiment of the present invention.

Display 23 of top portion 69 may comprise an LCD as depicted in FIG. 7. Display 23 may have a fan speed indicator 74, speed/duration number indicator 75, "for" indicator 76, hour indicator 77, time indicator 78, "turn on at" indicator 79, random mode indicator 80, "timer" indicator 92, light on/off indicator 91, light level indicators 81a-f, low battery indicator 82, main number indicator 83, program number indicator 84, temperature indicator 85, down arrow indicator 86, fan speed indicator 87, up arrow indicator 88, temperature control mode indicator 89 and winter mode indicator 90. Fan speed indicator 87 is preferably a rotating light configuration whereby a plurality of lights shaped like fan blades turn on and off to give the appearance of a rotating fan. The speed of rotation of these lights is approximately equal to the speed of rotation of the fan as disclosed in U.S. Pat. No. 5,189,412 to Mehta et al. which is hereby incorporated by reference. Three blades, as shown in FIG. 7, may be lit at any one time instead of four as disclosed in the '412 patent to Mehta et al.

According to one preferred method of operating this apparatus, two main modes of operation, a program mode and a manual override mode, for the fan and for the light are provided. Upon power up of the system, a default program will be stored in transmitter microprocessor 24. This default program will be utilized by transmitter microprocessor 24 to operate the system in program mode. Transmitter 21 and receiver 17 will continue in this mode of operation until instructed otherwise by a user. Given that light unit 9 and fan unit 8 are two separate devices operated under control of microprocessor 24, both units have an initial or start up mode of operation. For example, light unit 9 may be in manual override mode, whereas fan unit 8 may be in program mode, or vice versa.

Figure 8:
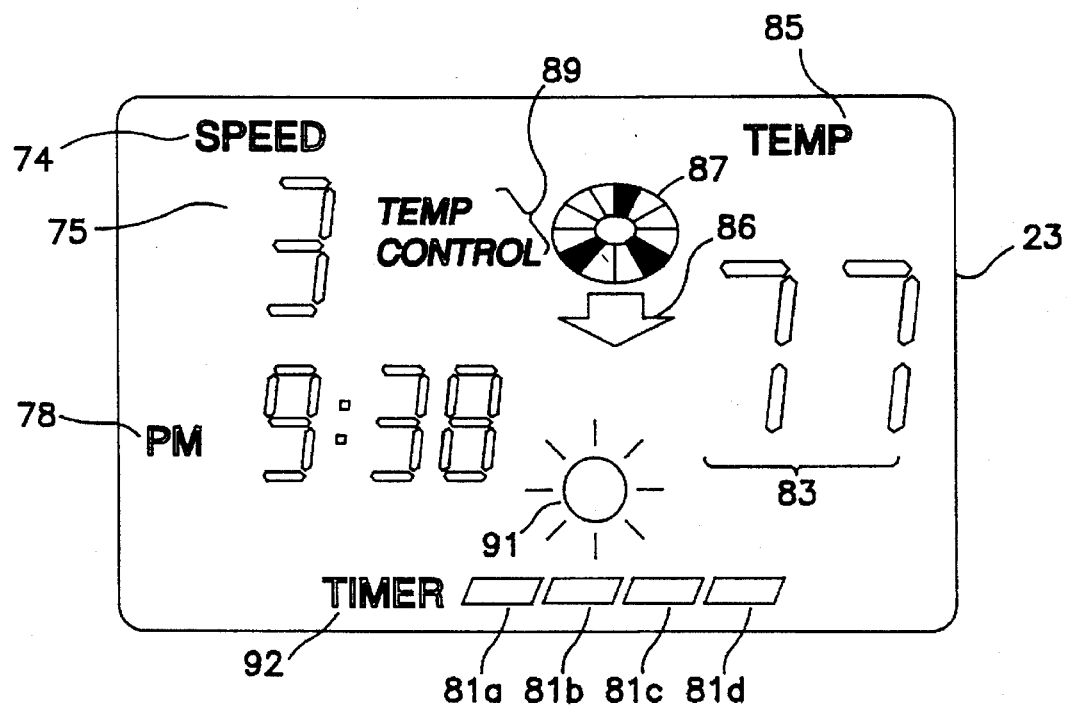
FIG. 8 depicts the display screen of FIG. 7 during program mode operation of both the light and fan.
Figure 9:
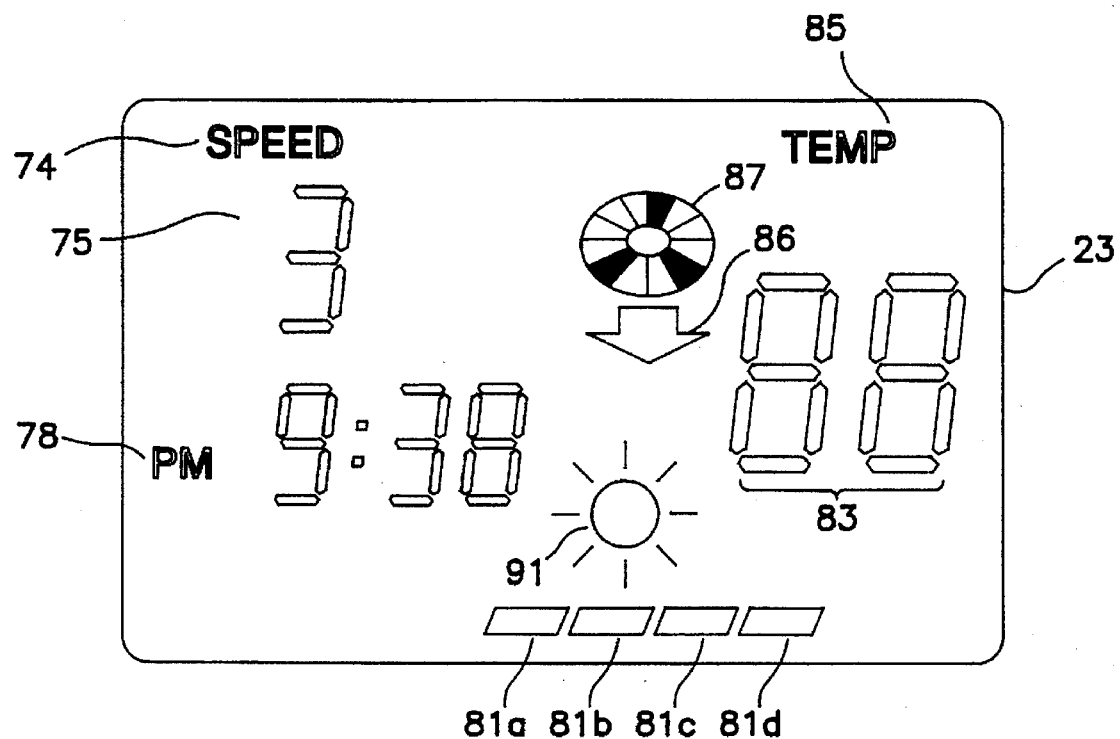
FIG. 9 depicts the display screen of FIG. 7 during manual override mode operation of both the light and fan.

Under program mode operation of fan unit 8 and light unit 9, display 23 may appear as depicted in FIG. 8. Time indicator 78 reflects the current time. "Temp" indicator 85 is illuminated or activated to indicate that main number indicator 83 reflects room temperature. Speed indicator 74 is illuminated or activated to indicate that speed/duration number indicator 75 reflects the fan speed, for example, "3." Further, fan unit 8 may have six speeds such as high, 5, 4, 3, 2, and low, as well as an off state or zero speed. Thus speed/duration number indicator 75 might indicate "H," "5," "4," "3," "2" or "L." If fan unit 8 is off, the speed indicator 74 and speed/duration number indicator 75 may be dark or deactivated to conserve power. When fan unit 8 is on, however, the blade images of fan speed indicator 87 rotate to indicate that fan unit 8 is on. The speed of rotation of the blade images in the display is proportional to the actual speed of fan blade rotation. If the fan speed is high, the fan speed indicator 87 will also rotate at a high speed. The direction of fan air movement is indicated by down arrow indicator 86 or up arrow indicator 88. If the fan is moving air in an upward direction, then down arrow indicator 86 is dark and up arrow indicator 88 of FIG. 7 is illuminated. When fan unit 8 is in program mode, temperature control mode indicator 89 is illuminated or activated.

Further, light on/off indicator 91 is illuminated to indicate when light unit 9 should be on. Alternatively, light on/off indicator 91 may flash on and off when light unit 9 is on. In a preferred embodiment shown in FIG. 7, light unit 9 has a plurality of light levels, for example, six. The number of light level indicators 81a-f is equal to the number of light levels available. Thus, the number of light level indicators that are illuminated or activated in display 23 corresponds to the level of illumination of the light. In FIG. 8, for example, four lights out of six are illuminated indicating that the light level is "4." According to the display of FIG. 8, light unit 9 is in program mode as indicated by "timer" indicator 92.

MANUAL OVERRIDE MODE ACTIVATION

At any time during the operation of the apparatus, either fan unit 8 or light unit 9 may be placed into manual override mode. To switch fan unit 8 into manual override mode, fan button 54 (FIG. 6) of the control panel 25 associated with transmitter 21 may be depressed. Temperature control mode indicator 89 will turn off as shown by comparing FIG. 8 and FIG. 9 and main number indicator will display "88." During manual override mode operation, the operation of fan unit 8 is not dependent upon the default program or any program selected by the user. Rather, fan speed is manually controlled by use of fan override button 54. In order to turn fan unit 8 on or off while in manual override mode, fan override button 54 may be toggled. To select a fan speed within the on state of fan unit 8, fan override button 54 may be toggled into the on position and then held until the desired fan speed is displayed by speed/duration number indicator 75. Transmitter microprocessor 24 causes the number indicated on speed/duration number indicator 75 to cycle through the six speeds at a predetermined rate while the user continues to hold the fan override button 54. When the user releases fan override button 54, the speed displayed on speed/direction number indicator 75 becomes the selected speed of the fan. At any time during manual override mode operation, the user may return the fan to program mode operation by pressing the program button 56.

To switch light unit 9 into manual override mode operation, light override button 55 (FIG. 6) may be depressed. Timer light 92 on display 23 will turn off as indicated by comparing FIG. 8 and FIG. 9. Light unit 9 is then controlled by light override button 55. By toggling light override button 55, light unit 9 may be turned on or off. When light unit 9 turns on, it will turn on at the highest illumination level 1, for example, at level "6." To dim the light, light override button 55 may be held while microprocessor 24 causes the light level to decrease over a predetermined time increment until light override button 55 is released. Again, as with manual override mode of fan unit 8, at any time, the user may return to program mode by pressing program button 56.

PROGRAM MODE OF THE FAN UNIT

As indicated above, transmitter microprocessor 24 has a ROM for storing information thereon. Transmitter microprocessor 24 may store a default program for both the fan and light in ROM. The default program stored for fan unit 8 provides a program for changing the speed of fan unit 8 according to the temperature in the room. This program contains a suitable temperature for each speed. The speed then increases to the next faster fan speed when the measured room temperature rises above the temperature associated with the next faster fan speed. Also, the speed decreases to the next slower fan speed when the measured room temperature falls below the temperature associated with the operating fan speed. The variation is not set according to a fixed temperature interval, but is completely programmed to suit the user's preferences. A default program might be as in Table 2 below.

TABLE 2

| Sample temperature-speed default program | |
|---|---|
| TEMP | SPEED |
| 82° F. | HIGH |
| 80° F. | 5 |
| 78° F. | 4 |
| 76° F. | 3 |
| 72° F. | 2 |
| 70° F. | LOW |
| — | OFF |

According to this sample temperature-speed default program, when the temperature is greater than or equal to about 82° F., fan unit 8 operates at the highest speed. Thus, the temperature associated with each speed is the lowest temperature at which that speed level is activated. Also, until the temperature reaches about 70° F., fan unit 8 will not automatically activate. The default program also may store a direction of air movement created by the fan at each temperature level. Table 3 below indicates a typical sample temperature-speed-direction default program which may be utilized by transmitter microprocessor 24.

TABLE 3

| Temperature-speed-direction default program | | |
|---|---|---|
| TEMP | SPEED | DIRECTION |
| 82° F. | HIGH | UPDRAFT |
| 80° F. | 5 | UPDRAFT |
| 78° F. | 4 | UPDRAFT |
| 76° F. | 3 | UPDRAFT |
| 72° F. | 2 | DOWNDRAFT |
| 70° F. | LOW | DOWNDRAFT |
| — | OFF | — |

As illustrated in Table 3, at higher temperatures, fan unit 8 is programmed to move air upward as would be used in cooler seasons to circulate warm air which tends to remain near the ceiling throughout the room. By moving air upward, the cooler air at the floor is moved towards the ceiling, thereby forcing the warm air near the ceiling to circulate. In warmer seasons, typically fan unit 8 is used to move air down onto the persons in the room and to circulate any cool air throughout the room. Thus, at temperatures from about 70° F. to 76° F., fan unit 8 may be programmed to move air down. The default program, as illustrated in Table 3 above, may be used throughout the entire year because changes in seasons are compensated for by changes in the direction of air movement dependant upon the temperature.

Figure 10:
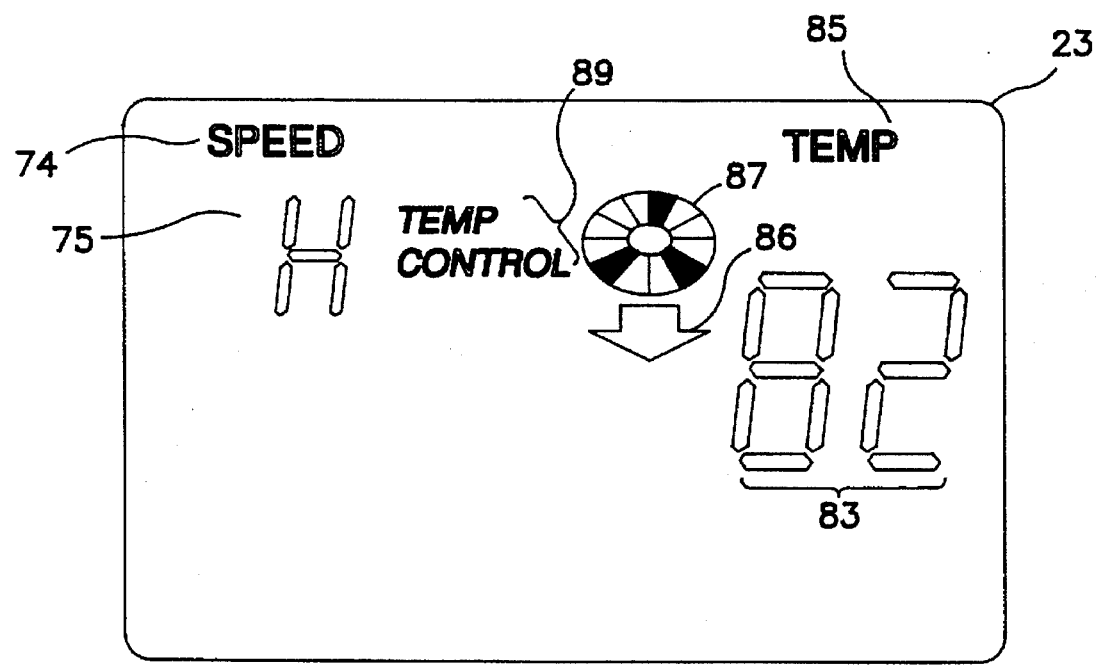
FIG. 10 depicts the display screen of FIG. 7 during programming of the fan.

Nevertheless, every user may not prefer the default program and, therefore, may wish to change the default program to suit the conditions desired for the room in which the fan is placed or for the geographic location at which the user resides. To change the fan program, fan speed button 65 may be depressed. Display 23 will then be preferably as shown in FIG. 10, which depicts previously programmed and/or default temperature setting for the highest speed of the fan. By using up-down button 63, the user can change the temperature above which the highest speed of the fan will operate. Downward air movement or upward air movement may be selected to correspond to the direction of airflow desired by use of reverse button 58. By toggling reverse button 58, up arrow indicator 88 and down arrow indicator 86 will alternatively illuminate to reflect the direction of airflow selected. When the user has set the temperature and direction as desired for the highest speed, the temperature and direction values for the next highest speed may be set by depressing fan speed button 65 and repeating the procedure described above. This process may continue until a temperature and direction value for each of the various speeds provided by fan unit 8 has been programmed. After programming is complete, transmitter microprocessor 24 waits a predetermined period of time and then returns the display to a normal clock display mode. The new program selected by the user is then stored in the RAM of transmitter microprocessor 24 for access in controlling the operation of fan unit 8.

PROGRAM MODE OF THE LIGHT UNIT

The default program in transmitter microprocessor 24 may also contain a default setting for light unit 9. The present invention provides a unique method of programming light unit 9 to selectively activate and deactivate over a certain time periods. A look-up table is stored in memory, for example, as shown below in Table 4.

TABLE 4

| Sample light program matrix for light control | | | | | |
|---|---|---|---|---|---|
| | START TIME | | | | |
| HRS ON | 5:00 PM | 6:00 PM | 7:00 PM | 8:00 PM | 9:00 PM |
| 1 | 1 | 2 | 3 | 4 | 5 |
| 2 | 6 | 7 | 8 | 9 | 10 |
| 3 | 11 | 12 | 13 | 14 | 15 |
| 4 | 16 | 17 | 18 | 19 | 20 |
| 5 | 21 | 22 | 23 | 24 | 25 |
| 6 | 26 | 27 | 28 | 29 | 30 |
| 7 | 31 | 32 | 33 | 34 | 35 |
| 8 | 36 | 37 | 38 | 39 | 40 |
| 9 | 41 | 42 | 43 | 44 | 45 |
| 10 | 46 | 47 | 48 | 49 | 50 |
| 11 | 51 | 52 | 53 | 54 | 55 |
| 12 | 56 | 57 | 58 | 59 | 60 |
| 13 | 61 | 62 | 63 | 64 | 65 |

The numbers under the starting time and across from a certain "hours on" time are called program numbers. The light program mode, for example, may be represented by one of the 65 program numbers. For example, according to program number 23 the light would be turned on at 7:00 PM for five hours, turning off at 12:00 midnight. The default program may store a program number for light unit 9 such as "23," for example. Light illumination may also be programmed into the default program by a number from to the maximum number of light illumination levels provided. Further, the light program mode provides a random mode of operation. In the random mode, light unit 9 activates and deactivates at various intervals within the time period light unit 9 is programmed to be on. By using the random mode, the user may simulate activity within a room. This may be useful as a security feature when the occupants of a residence, for example, are away on vacation. The default program for light unit 9 may indicate the random mode.

Figure 11:
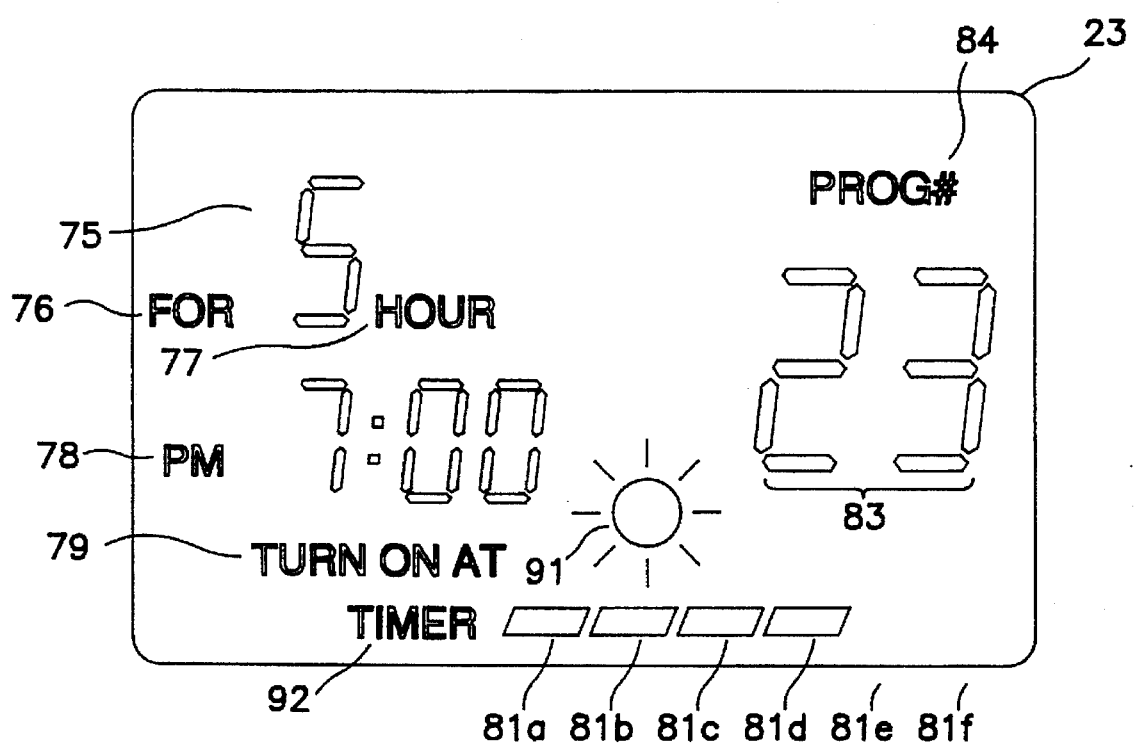
FIG. 11 depicts the display screen of FIG. 7 during programming of the light.

A user may desire to change the current program number, illumination level for the program or random mode operation of light unit 9. In order to do so, light program button 64 may be depressed. Display 23 is then presented as depicted in FIG. 11. "For" indicator 76 illuminates or activates to indicate that speed/duration number indicator 75 represents the current duration of operation for light unit 9 according to the program number. "Turn on at" indicator 79 also activates to indicate that time indicator 78 represents the time at which light unit 9 is currently programmed to activate. Program number indicator 84 turns on to indicate that main number indicator 83 represents the current program number.

To change the program number, up-down button 63 of programming keyboard 66 is used. The user may depress the up or down portion of button 63 until the desired program number is displayed in main number indicator 83. To change the illumination level for the program mode operation of light unit 9, light override button 55 may be depressed and held until the desired light level appears on light level indicators 81a–f. To activate or deactivate the random mode, random button 59 may be depressed. When random button 59 is depressed, random indicator 80 illuminates or activates. To deactivate random mode, random button 59 may be depressed again, whereby random indicator 80 will become dark or deactivate. Transmitter microprocessor 24 waits a predetermined amount of time after the last operation by the user in light programming mode before returning display 23 to a normal clock display showing the current light-fan operation as depicted in FIG. 8, for example.

The light program number may also differ for each day of the week. This may be desirable for persons who are frequently away from their residence during the week, so that the safety features of the light may be programmed for weekdays, and not utilized during the weekend when the user will be present. A day indicator (not shown) may be provided on display 23 to indicate the current day of the week when in normal operation. When light unit 9 is being programmed, the day light would indicate the day of the week which is being programmed. By continuously or repeatedly pressing a day button (not shown), each of the days of the week may be programmed before transmitter microprocessor 24 returns display 23 to indicate the current operating conditions of fan unit 8 and light unit 9.

Because microprocessor 24 uses the current time in determining the operation of light unit 9, a clock is provided. The current clock value known to microprocessor 24 is displayed on display 23 at time indicator 78. To change the value of time indicator 78, hour button 61a and minute button 61b may be used. To change the hour value, hour button 61a may be depressed until the desired hour value is shown in time display 78. Likewise, to change the minute value, minute button 61b may be depressed until the desired minute value is shown in time display 78.

A delay off button 57 may be selected at any time during either manual override mode of light unit 9, or when light unit 9 is in program mode, but light unit 9 is currently not on. When the user depresses delay off button 57, light unit 9 will activate for a predetermined period and then deactivate. This feature may be useful to allow the user to exit a room with light unit 9 still activated, but to deactivate light unit 9 after the user has exited the room. The predetermined period may be set to two minutes, for example.

The present invention also provides a demo button 62. When demo button 62 is depressed, transmitter microprocessor 24 runs a demo program which demonstrates several of the features of fan unit 8. For example, the demo program may demonstrate the light illumination level selection process. Further, the demo program may also demonstrate the various speeds of fan unit 8, or the random mode of light unit 9. The demo program may, for example, perform a two minute demonstration showing each light and fan unit control state and responding to the control state for a few seconds.

A winter mode button 60 may also be provided. When winter mode button 60 is depressed at any time, fan unit 8 is placed in program mode and a winter program stored in memory is activated. The winter program may set temperature and fan blade rotation direction so as to reclaim heat trapped on the ceiling and evenly circulate that heat throughout the room. Such a program may be as shown in Table 4.

CONTROL OF FAN AND LIGHT UNITS BY MICROPROCESSOR

Figure 12A:
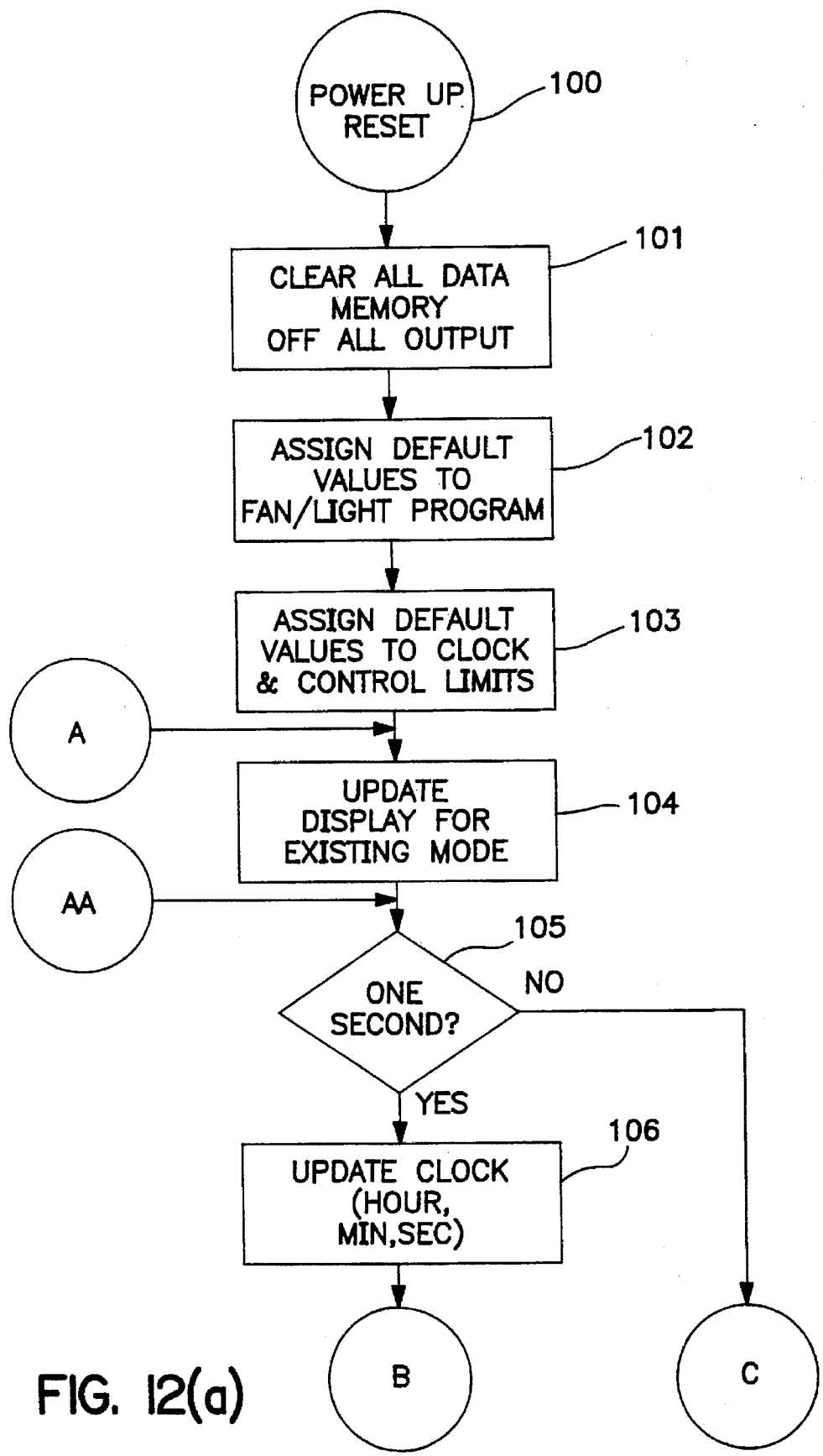
FIGS. 12(a)–12(d) depict a flow diagram of the operation of the transmitter microprocessor unit.

Operation of transmitter microprocessor 24 is described with respect to FIGS. 12(a)–12(d). As depicted in FIG. 12(a), initially transmitter microprocessor 24 is in a power up or reset state 100. This occurs when a new battery is installed in the device or the reset button is depressed. After power up or reset state 100, transmitter microprocessor 24 clears all data stored in its RAM in state 101. Default programs for both fan unit 8 and light unit 9 may then be stored in the microprocessor memory in state 102. Alternatively, the ROM may have these programs burned in. In this instance, microprocessor 24 activates the programs in ROM in state 102. The default programs for fan unit 8 may be, for example, as shown in Table 3 and may be, for example, program number "23" for light unit 9.

Next, default values are assigned in state 103 to the time keeping unit (not shown) in CPU 33 which provides time information to display controller 42 for display in time indicator 78. The default value for the clock may be, for example, 12:00 AM SUN. A default temperature value is also entered along with a default value for manual override or program control mode of both fan unit 8 and light unit 9. For example, the default temperature may be 80° F. and the default control mode may be program control of both fan unit 8 and light unit 9. Display 23 is illuminated by display driver 42 providing the default values as inputs in state 104. Transmitter microprocessor 24 at state 105 begins using real time clock base 41 to determine if one second has passed. If so, the hour, minutes and seconds of the clock value stored by CPU 33 is updated in state 106 and transmitter microprocessor 24 enters state 107. If one second has not yet passed, transmitter microprocessor 24 enters state 113.

Figure 12B:
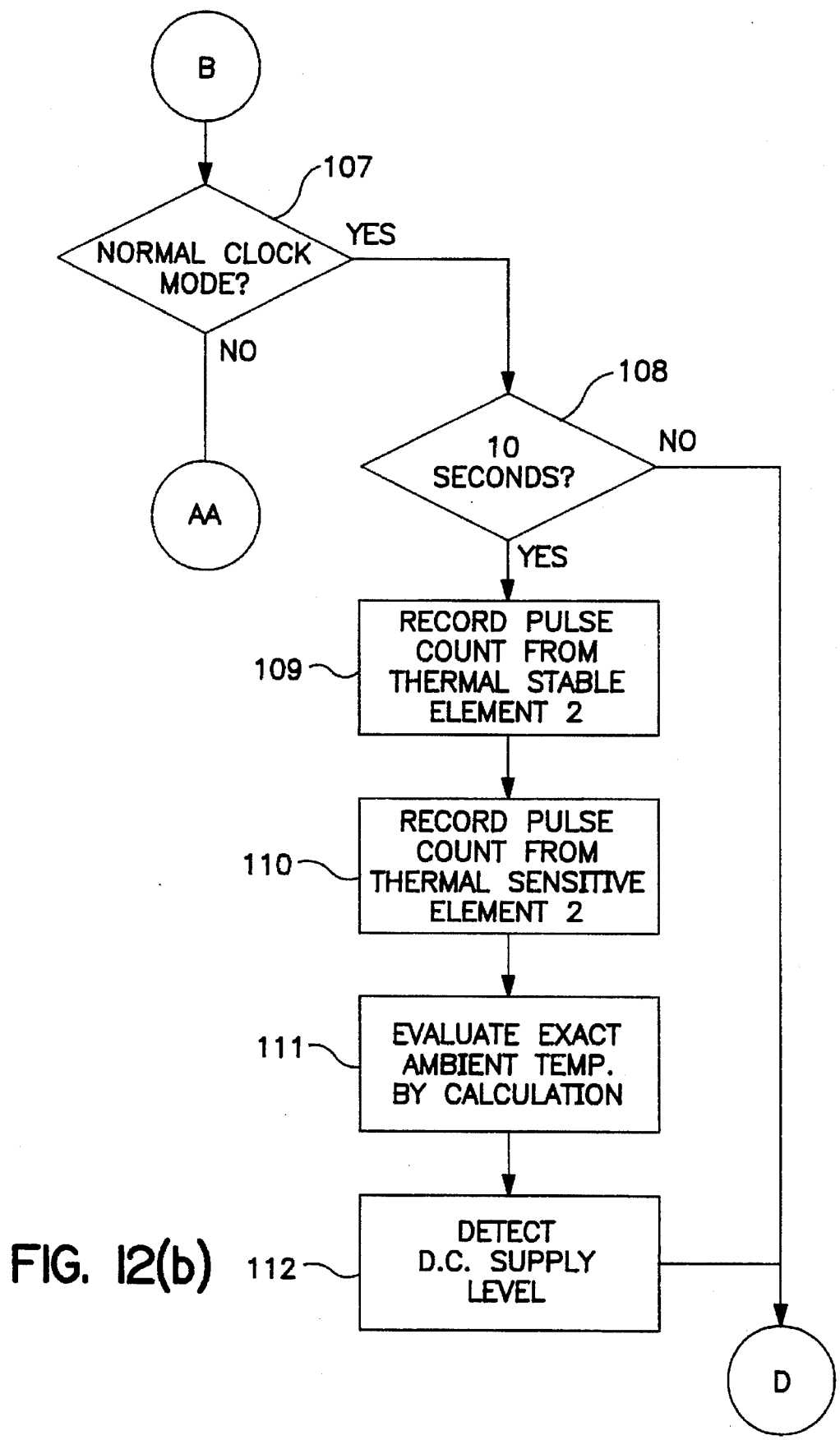
Figure 12C:
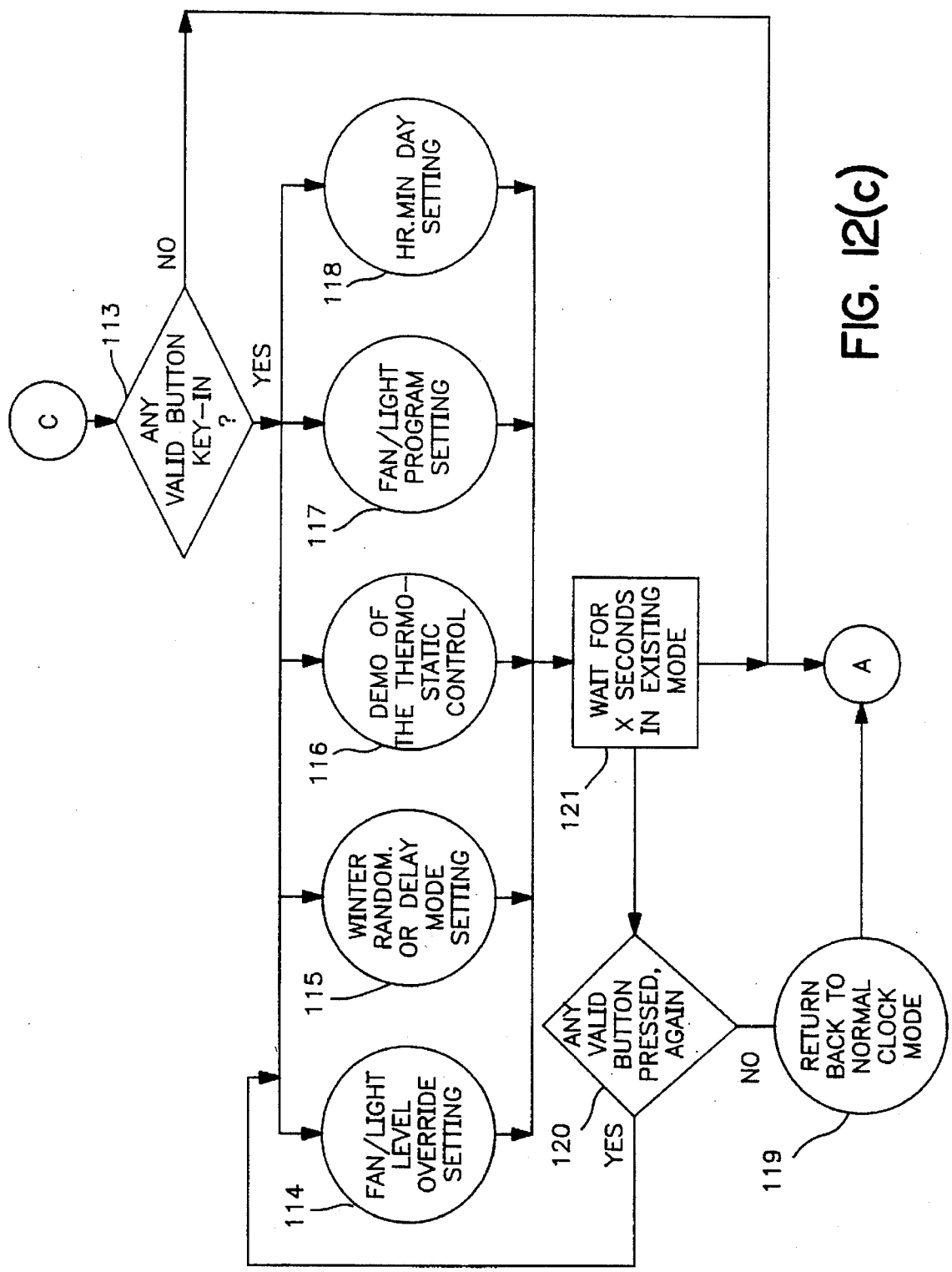

As shown in FIG. 12(c), at state 113, transmitter microprocessor 24 determines whether any of the valid buttons on remote control unit 72 have been depressed. The valid buttons comprise fan override button 54, light override button 55, winter mode select button 60, random mode select button 59, delay off button 57, demonstration button 62, fan speed button 65, light program select button 64, hour button 61a and minute button 61b. If not, control returns to state 104. If a valid button has been depressed, control passes to either state 114, 115, 116, 117 or 118, depending upon which button was depressed. If either fan override button 54 or light override button 55 was depressed, control passes to state 114. If winter mode select button 60, random mode select button 59 or delay off button 57 was pressed, then control passes to state 115. If demonstration button 62 was pressed, control passes to state 116. If either fan speed select button 65 or light program select button 64 was pressed, control passes to state 117. If either hour button 61a or minute button 61b was pressed, control passes to state 118. States 114–118 are control input states whereby the user may alter the operation of fan unit 8 or light unit 9. During input of user information in states 114–118, display 23 corresponds to the information being input, as discussed with respect to FIGS. 7–11. The internal clock value of CPU 33, however, must be updated, i.e., the time must still be kept accurately. Transmitter processor 24 has two modes of display: manual clock mode and input mode. States 114–118 place the display in input mode.

During input mode, control passes to state 121 in which processor 24 determines if a predetermined time period has elapsed since a designated event. That event might be, for example, a valid button being depressed. The time period might be, for example, five seconds. If the predetermined time period has elapsed, control passes to state 120 in which processor 24 determines if another valid button has been depressed within the predetermined time period. If so, the predetermined time period count is reinitialized in state 121. If not, state 119 is entered to return display 23 to normal clock mode.

If fan override button 54 was depressed to enter state 114, fan override button 54 is valid to activate or deactivate fan unit 8 or to increase or decrease the fan speed according to the description of fan manual override mode. If light override button 55 was depressed to enter state 114, light override button 55 is valid to activate or deactivate light unit 9 or to increase or decrease the light level. Program button 56 is valid to return the operation to program mode. All other buttons are preferably not valid in state 114.

During states 115 and 116, it is preferable that only the button which caused the processor to enter state 115 or 116 is valid. For example, if winter mode select button 60 was depressed to enter state 115, then only button 60 is valid during state 115 to deactivate that mode. The same preferably holds when depressing random mode button 59, delay off button 57 and demonstration button 62 for state 116.

If state 117 were entered by pressing fan speed select button 65, then up-down button 63, reverse button 58 and fan speed select button 65 are valid to enable fan unit 8 to be programmed as described with respect to FIG. 10. If state 117, was entered by depressing light program select button 64, then up-down button 63 and random button 59 are valid to enable the light program to be selected, as described with respect to FIG. 11. In state 118, hour button 61a and minute button 61b are active to enable the clock to be set. As discussed above with respect to another embodiment, the day may be programmed to provide different light programs for different days. As such, a day button (not shown) would be provided and would be active in state 118 to set the day of the week along with the clock value.

Turning to FIG. 12(b), at state 107, processor 24 identifies the present display mode. If the current display mode is in normal clock mode, control passes to state 108. Otherwise, the current display mode is in input mode, and control returns to state 105. At state 108, processor 24 determines if a rest period, e.g., ten seconds, has passed since either power-up or the previous temperature reading. This number may be selected depending upon the likely rate of temperature change in the room containing the fan. During this rest period, the temperature reading is not updated. By updating the temperature only every ten seconds, the processor is free to perform other functions. Ten seconds may be selected so that processor 24 may respond to fairly rapid temperature changes in a relatively short period of time. Depending on the speed of processor 24 or rate of temperature change, the rest period may range anywhere from less than one second to several minutes or even several hours. At state 108, if ten seconds have not passed, then control passes to state 123. If ten seconds have passed, states 109, 110 and 111 provide a measurement representing the temperature for the room. States 109 and 110 may, for example, provide a ratio which may be used to index a look-up table-in state 111. The measured temperature is stored for later use by time and temperature comparator 44. In state 112, DC power supply 29 is monitored to determine if the battery providing power to DC power supply 29 is low. If the battery power level is low, low battery indicator 82 is activated. Control then passes to state 123.

Figure 12D:
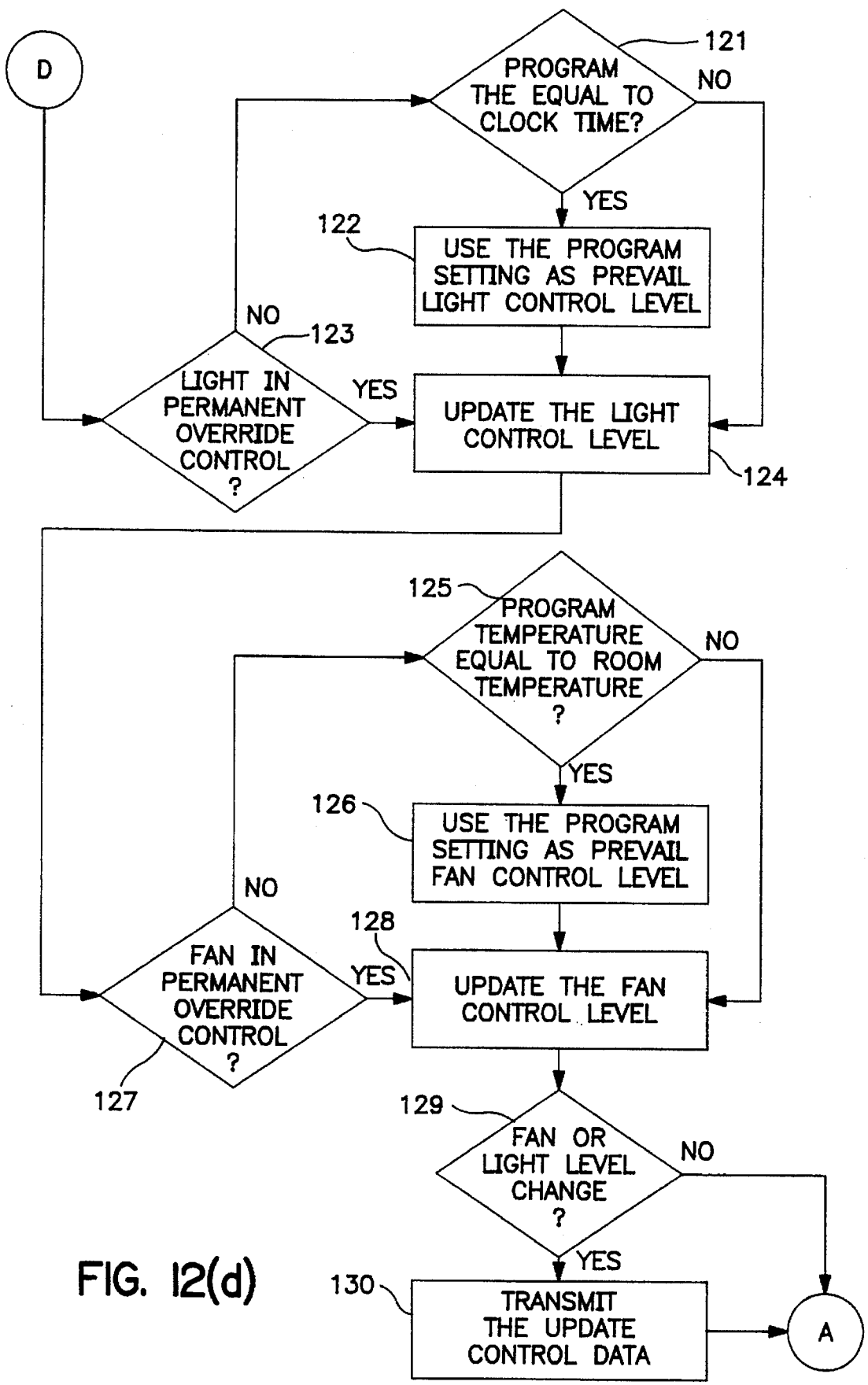

Referring now to FIG. 12(d), state 123 determines whether light unit 9 is in manual override mode. If so, control passes to state 124 and if not, to state 121. State 121 determines in time and temperature comparator 44 if either the programmed on time or off time is equal to the time keeper value in CPU 33. If the time keeper value equals the on-time of the program number stored, then in state 122, transmitter microprocessor 24 determines the programmed illumination level and whether random mode is active. In state 124, transmitter microprocessor 24 indicates that a light update is required and stores the new desired light level in memory. If the current time is equal to the off time as determined by the on time plus the duration associated with the program number, at state 124, then transmitter microprocessor 24 indicates that the light needs to be turned off. In state 124, the apparatus also may determine that light unit 9 is to be turned on or off if light unit 9 is to be on and off in random mode. In state 124, the apparatus varies the operation of light unit 9 in random mode according to a random schedule.

If light unit 9 is not in manual override mode, control passes from state 123 to state 124 in which processor 24 determines if the user has requested a light change such as from on to off or a change in illumination through the use of light override button 55. If so, processor 24 indicates a light update request to state 129.

After determining whether the light illumination level or on-off state needs to be changed, control passes to state 127 in which processor 24 determines whether fan unit 8 is in manual override mode. If so, control passes to state 128. If not, transmitter microprocessor 24, in state 125, determines if the room temperature has either risen above the temperature associated with the next fastest fan speed or below the temperature associated with the current fan speed. To determine this, transmitter microprocessor 24 needs to compare the measured temperature, operating fan speed, the temperature set-point associated with the next highest fan speed and the temperature set-point associated with the current fan speed. Temperature is provided by ambient temperature conversion element 40. Operating fan speed is taken from the value stored in memory. Throughout the operation of fan unit 8, anytime a fan speed change is requested, transmitter microprocessor 24 stores the requested fan speed in memory as the operating fan speed. Both set-point temperatures are determined using the look-up table similar to Table 3 stored in memory.

Monitoring the temperature every ten seconds should be sufficient since it is not likely that the temperature is going to drop sufficiently in that time to require a two speed change in fan speed. Of course, the processor could be programmed to monitor the temperature more frequently than ten seconds. If the rest time was increased, however, another scheme of comparison may be necessary. If, for example, the rest time was set at two minutes, then instead of only comparing the current temperature with the set-point of the next highest fan speed and the set-point of the current fan speed, it may be desirable to compare the current temperature with the set-points of all of the fan speeds through a multiple comparison scheme. Such a scheme may employ binary tree or other decision tools to derive the proper fan speed for the current room temperature. States 125 and 126 determine the desired fan speed and airflow direction associated therewith as described with respect to Table 3. In state 126, requested changes in conditions are stored. In state 128, transmitter microprocessor 24 determines if a fan speed change is required as may have been indicated at state 126.

If the fan is determined to be in manual override mode in state 127, then in state 128, transmitter microprocessor 24 determines if any manual fan speed or fan direction changes have been received via fan override button 54. If a fan speed or fan direction request has been made, a request is stored for use in state 129.

In state 129, transmitter microprocessor 24 determines if either a fan or light change has been requested during other states within the process. If no change is required, control returns to state 104 for further processing. If a change was requested, state 130 is responsible for triggering encoder 22 and RF transmitter 21 to transmit the control data to receiver microprocessor 12 as described with respect to FIGS. 3(a) and 5. The information transmitted may include an increase speed or decrease speed signal indicating the desired speed change. Such signals may also include the airflow direction associated with the desired fan speed. The signal may also include on, off, increase or decrease illumination signals for the light as determined in state 124.

RECEIVER TRANSMITTER OPERATION

Figure 13:
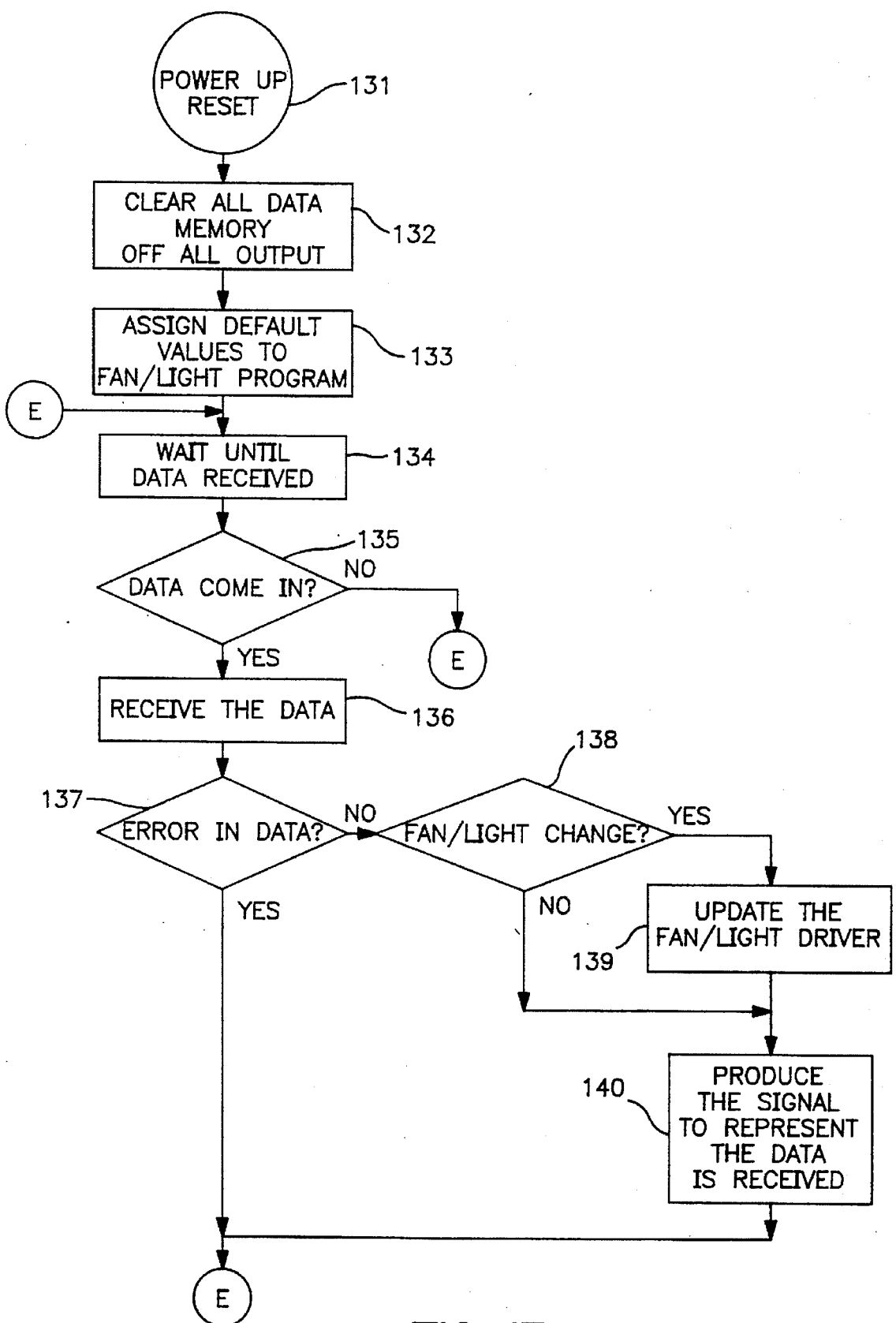
FIG. 13 depicts a flow diagram of the operation of the receiver microprocessor unit.

FIG. 13 depicts a flow diagram for receiver microprocessor 12. Upon power up or reset at state 131, receiver microprocessor 12 proceeds to clear all current data in the RAM during state 132. Next, default values for fan and light conditions are stored. For example, the default conditions may be fan-off and light-off and program mode operation for both. States 134 and 135 form a loop continually checking in state 135 for a signal indicating the receipt of data. If data is received, receiver microprocessor 12 moves into state 136 where it stores the data for subsequent processing and proceeds to state 137 to check for errors. Error detection methods used in state 137 are well known, and may include, for example, use of valid signal bits as a header before control bits. Valid signal bits may be, for example, 10011, and may be expected prior to the control data being sent.

If the data received is not valid, then control returns to state 134 to await receipt of other data. If the data received is valid, then state 138 determines what change, if any, is required. Based upon the requested change, during state 139 receiver microprocessor 12 updates the fan speed or light level via control signals to fan driving circuit 13 or light driving circuit 18. Receiver microprocessor 12 also stores the current state of fan unit 8 and light unit 9 in RAM. In state 140, receiver microprocessor 12 sends a signal to indicate receipt of valid data. This signal may be a light, RF signal or sound emission such as a beep. RF transmitter 21 may also have a receiver to await receipt of the acknowledgment beep, if so desired. In manual override mode, the beep serves to notify the user that the data is being received. In program mode, the beep may be used in connection with a receiver in RF transmitter 21 to continue to send the data, until it is properly received.

Although a detailed description of the invention has been provided, it should be understood that the scope of the invention is not to be limited thereby, but is to be determined by the claims which follow. Various modifications and alternatives will be readily apparent to one of ordinary skill in the art.

What is claimed is:

1. An apparatus for remotely controlling the operation of a light associated with a ceiling fan comprising:

an input device which enables a user to select a program number from a set of program numbers, the input device comprising means for increasing the program number and means for decreasing the program number;

a display means for displaying the selected program number to enable the user to determine which program number has been selected;

memory means for storing a look-up table comprising the set of program numbers with each program number in the set of program numbers corresponding to a particular on-time value and duration value for said light;

a clock which provides a time of day signal;

a processor, responsive to a selected program number, for indexing the look-up table in said memory means to select the on-time value and duration value corresponding to the selected program number, said processor generating a light control signal for operating the light in real time from the selected on-time and duration value and the time of day signal from the clock;

a transmitter for transmitting the light control signal from said processor;

a receiver for receiving the light control signal; and a light driving device connected to the light for turning the light on and off in response to the light control signal received by said receiver.

2. The apparatus of claim 1 wherein the light comprises a multi-level illumination light, wherein said input means further enables the user to select a desired illumination level for the light, wherein the light control signal includes the desired illumination level for the light, wherein the display means further displays the selected desired illumination level, and wherein said light driving device further turns the light to the desired illumination level in response to the light control signal.

3. An apparatus for remotely controlling the operation of a light associated with a ceiling fan comprising:

an input device which enables a user to select a program number from a set of program numbers, the input device comprising means for increasing the program number and means for decreasing the program number;

memory means for storing a look-up table comprising the set of program numbers with each program number in the set of program numbers corresponding to a particular on-time value and duration value for said light;

a clock which provides a time of day signal;

a processor, responsive to a selected program number, for indexing the look-up table in said memory means to select the on-time value and duration value corresponding to the selected program number, said processor generating a light control signal for operating the light in real time from the selected on-time and duration value and the time of day signal from the clock;

a transmitter for transmitting the light control signal from said processor;

a receiver for receiving the light control signal; and a light driving device connected to the light for turning the light on and off in response to the light control signal received by said receiver.

* * * * *

UNITED STATES PATENT AND TRADEMARK OFFICE
CERTIFICATE OF CORRECTION

PATENT NO.   : 5,627,527
DATED        : May 6, 1997
INVENTOR(S)  : Vinay MEHTA

It is certified that error appears in the above-indentified patent and that said Letters Patent is hereby corrected as shown below:

Title page, Notice Section [*], delete "5,529,229" and insert --5,528,229--.

Signed and Sealed this

Second Day of September, 1997

Attest:

BRUCE LEHMAN

Attesting Officer

Commissioner of Patents and Trademarks